Jan. 30, 1951  H. SPRAGUE, JR  2,539,872
TRANSVERSELY MOVABLE PISTON TYPE
CLUTCH FOR FLUID TRANSMISSIONS

Filed Jan. 22, 1948  2 Sheets-Sheet 1

Inventor
Harry Sprague, Jr., Deceased,
by Harry Sprague, Sr.,
Administrator Of The Estate By Clarence A. O'Brien
and Harvey B. Jacobson
Attorneys

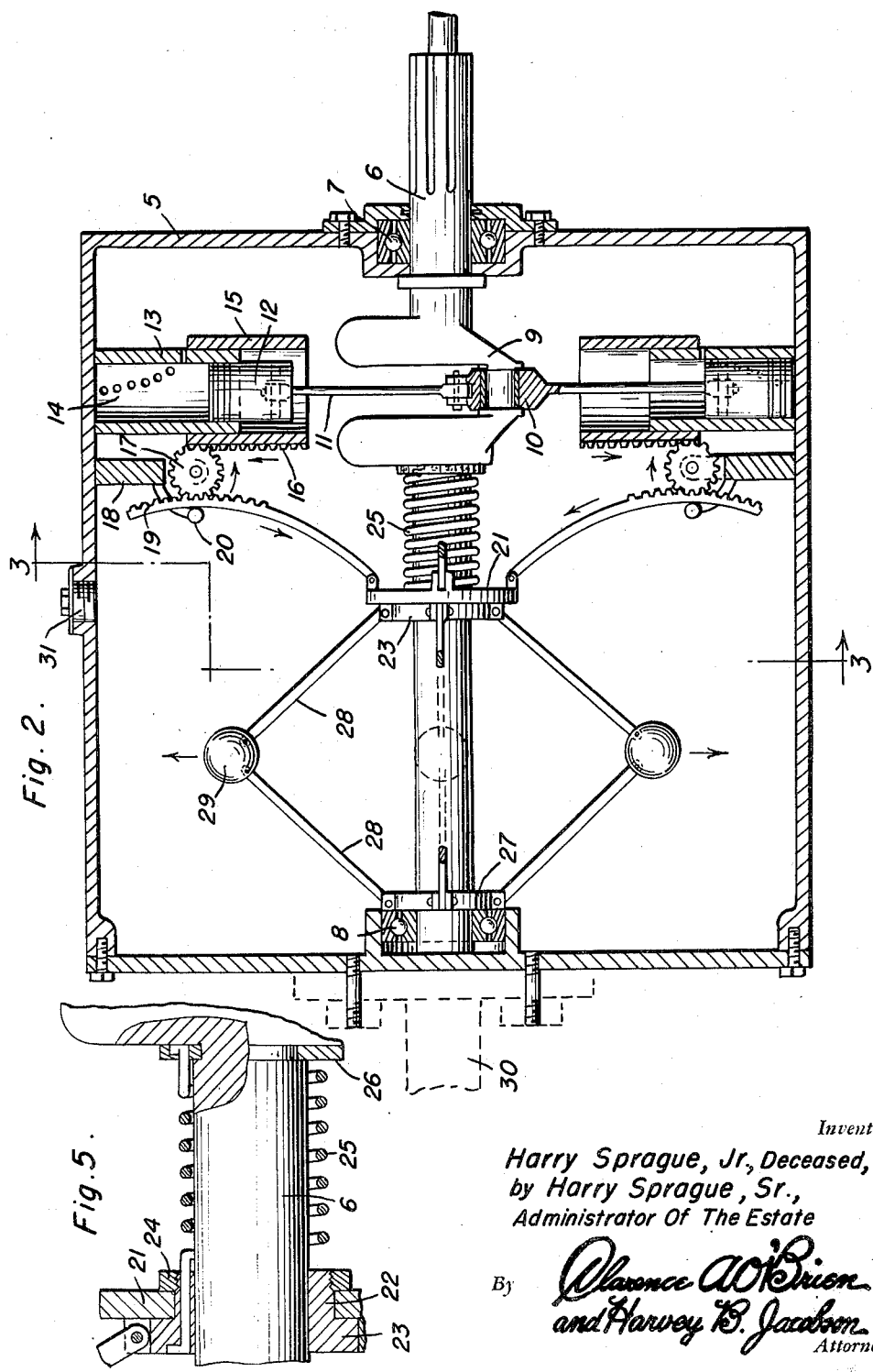

Patented Jan. 30, 1951

2,539,872

UNITED STATES PATENT OFFICE 2,539,872

TRANSVERSELY MOVABLE PISTON TYPE CLUTCH FOR FLUID TRANSMISSIONS

Harry Sprague, Jr., deceased, late of Clinton, Ill., by Harry Sprague, Sr., administrator, Clinton, Ill.

Application January 22, 1948, Serial No. 3,765

5 Claims. (Cl. 192—60)

The present invention relates to new and useful improvements in fluid transmissions for connecting drive and driven shafts and more particularly to means controlling the free movement of radially reciprocating pistons carried by one shaft and working in cylinders carried by the other shaft to rotate the driven shaft in accordance with the speed of the drive shaft.

An important object of this invention is to provide governor control means for the pistons and arranged to restrict the movement thereof in accordance with the speed of the drive shaft whereby to smoothly and gradually increase the speed of the driven shaft to its maximum speed.

A still further object of the invention is to provide an apparatus of this character of simple and practical construction, which is efficient and reliable in operation, relatively inexpensive to manufacture and otherwise well adapted to the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is an enlarged longitudinal sectional view taken substantially on a line 2—2 of Figure 1;

Figure 3:
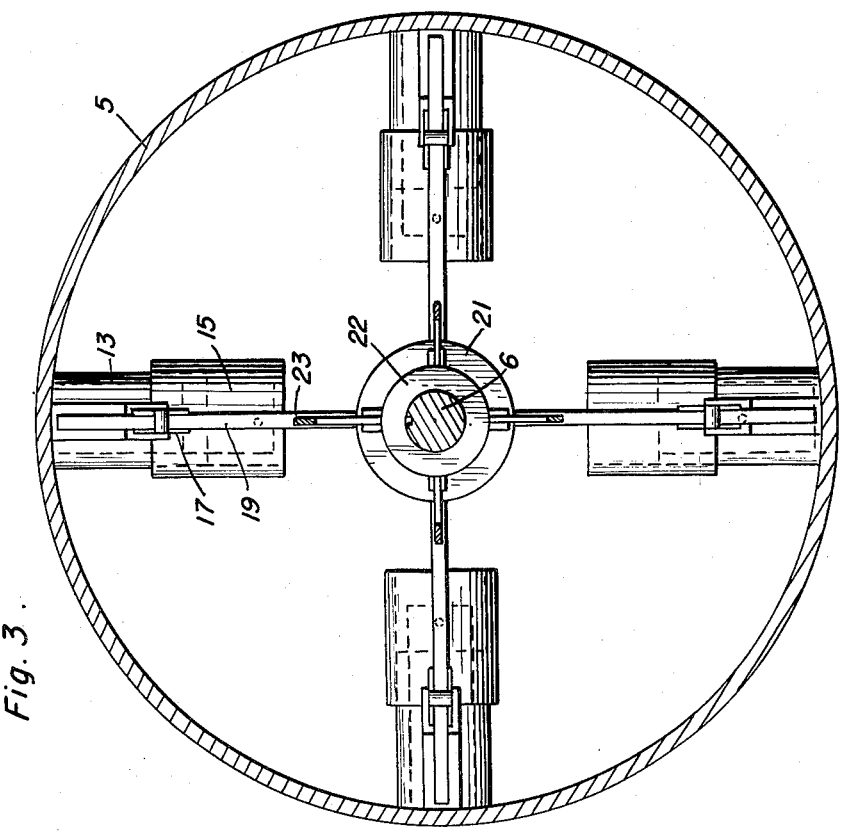
Figure 3 is a transverse sectional view taken on a line 3—3 of Figure 2.
Figure 1:
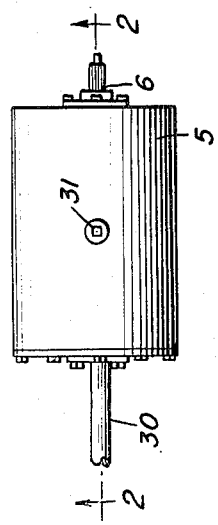
Figure 1 is a side elevational view of the transmission housing.
Figure 4:
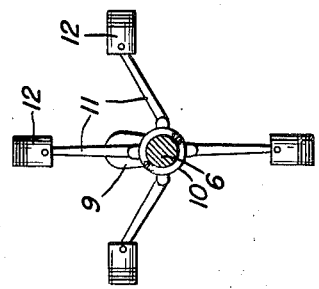
Figure 4 is a transverse sectional view of the crank shaft and showing the group of pistons operated thereby; and, Figure 5 is an enlarged longitudinal sectional view showing the connections for the governor control spring.

Referring now to the drawings in detail wherein for the purpose of illustration there is disclosed a preferred embodiment of the invention, the numeral 5 designates the cylindrical housing having a drive shaft 6 journalled in a bearing assembly 7 in one end of the housing with one end of the shaft projecting outwardly therefrom for connection with a source of power, while the inner end of the shaft 6 is journalled in a bearing assembly 8 in the opposite end wall of the housing.

The shaft 6 inwardly of the housing is formed with the crank 9 and connecting rod bearing 10 from which a plurality of connecting rods 11 extend with pistons 12 at their outer ends and working in cylinders 13 suitably secured to the inner side walls of the housing 5. The cylinders 13 are formed with longitudinally spaced apart openings 14 which form combined intake and discharge openings during reciprocation of the pistons therein.

The cylinders 13 extend radially of the housing 5 and the openings 14 are controlled by a sleeve 15 slidably mounted on the cylinder and provided at one side with a longitudinally extending rack bar 16.

Pinions 17 are journalled at the inner ends of brackets 18 suitably secured in the housing for engaging the rack bars 16 and the pinions are operated by arcuate rack bars 19 held against the pinions by guide rollers 20 journalled on the brackets 18. One end of the rack bars are pivoted to a collar 21 held on the hub 22 of a governor collar 23 by a nut 24, the governor collar being slidable on the shaft 6.

A retractible coil spring 25 surrounds the shaft 6 and is connected at one end to the shaft by means of a ring 26 and is connected at its other end to the governor collar 23 for rotation thereof with the shaft. The governor also includes a second collar 27 keyed to the shaft and arms 28 pivoted to the governor collars and pivoted at their outer ends to weights 29.

A driven shaft 30 is attached to the other end of housing 5.

The housing is supplied with a suitable liquid by way of filler plug 31.

In the operation of the device, the shaft 6 is driven at slow speed from a suitable source of power and the crank 9 drives pistons 12 working in cylinders 13. The spring 25 normally pulls governor weights 29 inwardly by pulling the collars 21 and 22 toward the right which pushes the arcuate rack bars 19 outwardly to rotate pinions 17 in a direction to slide sleeves 15 toward the inner ends of cylinders 13 to open the ports 14. The pistons then work freely in the cylinders without restriction and the housing 5 and driven shaft 30 remain idle.

As the speed of shaft 6 is increased the governor is actuated to pull arcuate rack bars 19 inwardly to rotate pinions 17 in a direction to slide sleeves 15 outwardly to close ports 14 which thus restricts action of pistons 12 and causes housing 5 and shaft 30 to rotate with shaft 6, the speed of shaft 30 being controlled by the speed of shaft 6.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In a power transmitting device, a fluid housing, a drive shaft journaled longitudinally in the housing and having one end projecting therefrom, internal cylinders fixed radially in the housing about the drive shaft, said cylinders having longitudinally spaced inlet and outlet ports, pistons mounted to reciprocate in the cylinders and operatively connected to the drive shaft, sleeves slidably disposed longitudinally on the cylinders, a governor carried by said drive shaft, means actuated by longitudinal movement of said governor on the drive shaft for sliding said sleeves to progressively close off the ports, said means including curvilinear reciprocating members pivotally carried by the governor and means for communicating movement of the members to the sleeves.

2. In a transmission, a fluid housing, a drive shaft journaled longitudinally in the housing and having one end projecting therefrom, internal cylinders fixed radially in the housing about the drive shaft, said cylinders having longitudinally spaced inlet and outlet ports, pistons mounted to reciprocate in the cylinders and operatively connected to the drive shaft, sleeves slidably disposed longitudinally on the cylinders, a governor carried by said drive shaft, means actuated by said governor for moving said sleeves to progressively close off the ports, said means including curvilinear reciprocating members pivotally carried by the governor, elements rotatably mounted in the housing in engagement with the cylinders and actuated by said reciprocating members.

3. In a transmission, a fluid housing, a drive shaft journaled longitudinally in the housing and having one end projecting therefrom, internal cylinders fixed radially in the housing about the drive shaft, said cylinders having longitudinally spaced inlet and outlet ports, pistons mounted to reciprocate in the cylinders and operatively connected to the drive shaft, sleeves slidably disposed longitudinally on the cylinders, a governor carried by said drive shaft, means actuated by said governor for moving said sleeves to progressively close off the ports, said means including curvilinear reciprocating rack bars pivotally carried by the governor, pinions operatively connected to the extending ends of the bars and rack bars disposed longitudinally on the sleeves and engaged by the pinions.

4. In a transmission, a fluid housing, a drive shaft journaled longitudinally in the housing and having one end projecting therefrom, internal cylinders fixed radially in the housing about the drive shaft, said cylinders having longitudinally spaced inlet and outlet ports, pistons mounted to reciprocate in the cylinders and operatively connected to the drive shaft, sleeves slidably disposed longitudinally on the cylinders, a governor carried by said drive shaft, means actuated by said governor for moving said sleeves to progressively close off the ports, said means including rack bars disposed longitudinally on the sleeves, pinions rotatably mounted in engagement of the rack bars, means carried laterally by the governor and operatively connected to the pinions.

5. In a transmission, a fluid housing, a drive shaft journaled longitudinally in the housing and having one end projecting therefrom, internal cylinders fixed radially in the housing about the drive shaft, said cylinders having longitudinally spaced inlet and outlet ports, pistons mounted to reciprocate in the cylinders and operatively connected to the drive shaft, sleeves slidably disposed on the cylinders, a governor carried by said drive shaft, means actuated by said governor for moving said sleeves to progressively cut off the ports, said means including arcuate rack bars pivotally carried by the governor, pinions mounted in the housing adjacent the cylinders, means for guiding said rack bars in engagement of the pinions, and rack bars disposed longitudinally on the sleeves and intermeshed with said pinions.

HARRY SPRAGUE, Sr.,
*Administrator of the Estate of Harry Sprague, Jr., Deceased.*

REFERENCES CITED

The following references are of record in the file of this patent:

UNITED STATES PATENTS

| Number | Name | Date |
| --- | --- | --- |
| 1,433,596 | Binfield | Oct. 31, 1922 |
| 2,034,702 | McClelland | Mar. 24, 1936 |
| 2,096,853 | Highsmith | Oct. 26, 1937 |
| 2,195,779 | Maddox | Apr. 2, 1940 |